(12) United States Patent
Park et al.

(10) Patent No.: US 9,631,718 B1
(45) Date of Patent: Apr. 25, 2017

(54) SHIFT LEVER FOR VEHICLE

(71) Applicant: SL Corporation, Daegu (KR)

(72) Inventors: Sung Gyu Park, Daegu (KR); Sangho Moon, Daegu (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 15/131,075

(22) Filed: Apr. 18, 2016

(30) Foreign Application Priority Data

Mar. 31, 2016 (KR) .................. 10-2016-0039659

(51) Int. Cl.
*F16H 59/02* (2006.01)

(52) U.S. Cl.
CPC ..... *F16H 59/0278* (2013.01); *F16H 59/0204* (2013.01)

(58) Field of Classification Search
CPC . F16H 59/0278; F16H 59/0204; F16H 59/044
See application file for complete search history.

(56) References Cited

U.S. PATENT DOCUMENTS

| 5,345,836 A | 9/1994 | Yokoyama et al. |
| 5,727,423 A | 3/1998 | Torii et al. |
| 2012/0000311 A1* | 1/2012 | Shioji ............... B60K 20/04 74/473.3 |
| 2013/0298712 A1* | 11/2013 | Moon ............... F16H 59/0278 74/473.3 |
| 2014/0191559 A1* | 7/2014 | Roach ............... B60K 20/08 298/19 R |

FOREIGN PATENT DOCUMENTS

JP          2011246089 A    12/2011

\* cited by examiner

*Primary Examiner* — Terence Boes
(74) *Attorney, Agent, or Firm* — Mintz Levin Cohn Ferris Glovsky and Popeo, P.C.; Kongsik Kim; Carolina Säve

(57) ABSTRACT

A shift lever for a vehicle includes a knob, a rod coupled to the knob, a first mounting member, and a second mounting member. At least one first connecting terminal is fixed to the first mounting member and at least one second connecting terminal is fixed to the second mounting member. The at least one second connecting terminal comes into contact with the at least one first connecting terminal for transmission of electric signals.

19 Claims, 18 Drawing Sheets

SHIFT LEVER FOR VEHICLE

CROSS-REFERENCE TO RELATED APPLICATION(S)

This application claims priority from Korean Patent Application No. 10-2016-0039659 filed on Mar. 31, 2016, the disclosure of which is incorporated herein by reference in its entirety.

BACKGROUND

1. Field of the Invention

The present invention relates to a shift lever for a vehicle, and more particularly, to a shift lever for a vehicle that simplifies an assembling process and reduces the required working time for assembling a shift lever.

2. Description of the Related Art

A vehicle transmission changes a gear ratio to maintain constant rotation of an engine based on the speed of the vehicle, and a driver may operate a shift lever to change the gear ratio of the transmission. In the shift mode of the transmission, a manual shift mode is a mode in which a driver changes a shift stage, and an automatic shift mode is a mode in which the shift stage automatically changes based on the speed of the vehicle when the driver selects a driving stage (D).

Further, a sports mode-type transmission is used to perform both the manual shift and the automatic shift in a single transmission. The sports mode-type transmission includes a transmission for manual shifting adjacent to a transmission for automatic transmission and thus, the driver may perform the manual shifting for increasing or decreasing the number of stages of gears, while performing the automatic transmission.

Recently, various devices for shifting function and convenient function have been provided on a knob of the shift lever to improve the driver convenience. For example, the knob of the shift lever includes a button for selecting the shift stage, a button for releasing the shift lock function called a shift locking function that allows the transmission when the shift conditions are satisfied and the like.

When the driver operates the button disposed on the knob of the shift lever, a structure that transmits an electric signal based on the button operation is required, and there is a need for a connecting process for transmission of electric signals between the knob and the rod when the knob and the rod are assembled to transmit electric signals based on the operation of the button provided on the knob of the shift lever.

In particular, when the assembly process of the knob and the rod and the connecting process for the transmission of the electric signals are performed separately, since the overall assembly process increases and the working time may increase, there is a desire for a scheme that decreases the working time by simplifying the assembly process to allow the connecting process for the transmission of electric signals to be performed more conveniently when assembling the knob and the rod.

SUMMARY

Aspects of the present invention provide a shift lever for a vehicle capable of simplifying the overall assembling and disassembling processes to allow the connecting process for transmitting the electric signals between the knob and the rod when coupling the knob and the rod to be performed simultaneously. However, aspects of the present invention are not restricted to the one set forth herein. The above and other aspects of the present invention that have not been mentioned will become more apparent to one of ordinary skill in the art to which the present invention pertains by referencing the detailed description of the present invention given below.

A shift lever for a vehicle according to an exemplary embodiment of the present invention may include a knob, a rod coupled to the knob, a first mounting member disposed to surround the rod in a hollow shape, and a second mounting member. At least one first connecting terminal is fixed to the first mounting member, and at least one second connecting terminal is fixed to the second mounting member. The at least one second connecting terminal comes into contact with the at least one first connecting terminal for transmission of electric signals. Other specific matters of the present invention are included in the detailed description and drawings.

According to the shift lever for the vehicle of the present invention as described above, there are one or more following effects. Since the electric signals may be transmitted between the knob and the rod without a separate assembly process when coupling the knob and the rod, there is an effect of simplifying the assembly process and the disassembling process to reduce the working time.

Effects of the present invention are not limited to the aforementioned effect, and other effects that have not been mentioned will be clearly understood to those skilled in the art from the scope of the claims.

BRIEF DESCRIPTION OF THE DRAWINGS

The above and other aspects and features of the present invention will become more apparent by describing in detail exemplary embodiments thereof with reference to the attached drawings, in which:

FIG. 12 is a schematic diagram illustrating a shift pattern according to the exemplary embodiment of the present invention;

DETAILED DESCRIPTION

Figure 1:
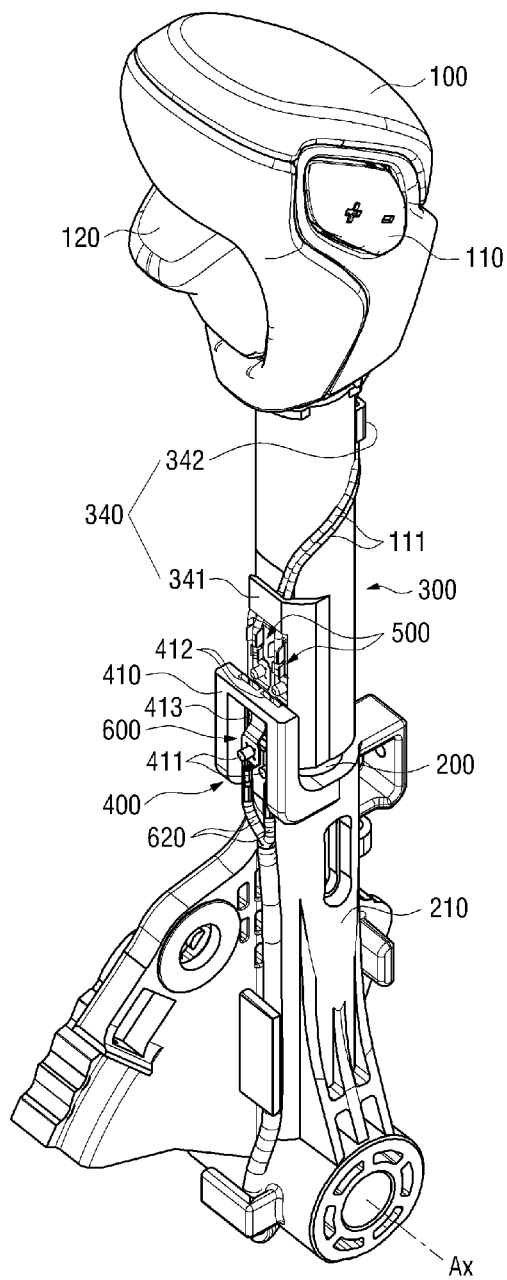
FIG. 1 is a perspective view illustrating a shift lever for a vehicle according to an exemplary embodiment of the present invention.

Advantages and features of the present invention and a method of achieving the same will become more apparent with reference to exemplary embodiments described below in detail in conjunction with the accompanying drawings. However, the present invention may be embodied in various different forms rather than being limited to the embodiments set forth herein. The present exemplary embodiments are merely provided to make the present disclosure complete and completely convey the concept of the invention to those skilled in the art, and the present invention will only be defined by the categories of claims. The same reference numerals throughout the specification refer to the same components. Thus, in some embodiments, well-known processing steps, well-known structures and well-known techniques will not be specifically explained to avoid ambiguous interpretation of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. The terms "comprise" and/or "comprising" used in the specification are used in the meaning of not excluding the presence or addition of one or more other components, steps, operations and/or elements other than the mentioned components, steps, operations and/or elements. Further, the term "and/or" includes each of the mentioned items and one or more combinations thereof.

Further, the exemplary embodiments described herein will be described with reference to the perspective views, cross-sectional views and/or schematic views that are ideal exemplary views of the present invention. Accordingly, the forms of the exemplary views may be modified by manufacturing techniques and/or tolerances. Accordingly, the embodiments of the present invention also include changes in forms generated depending on the manufacturing process rather than being limited to the illustrated specific forms. Moreover, each component in the respective drawings illustrated in the present invention may be illustrated in a slightly enlarged or reduced manner in consideration of convenience of explanation.

Hereinafter, the present invention will be described with reference to the drawings for explaining a shift lever for a vehicle according to the exemplary embodiments of the present invention.

Figure 2:
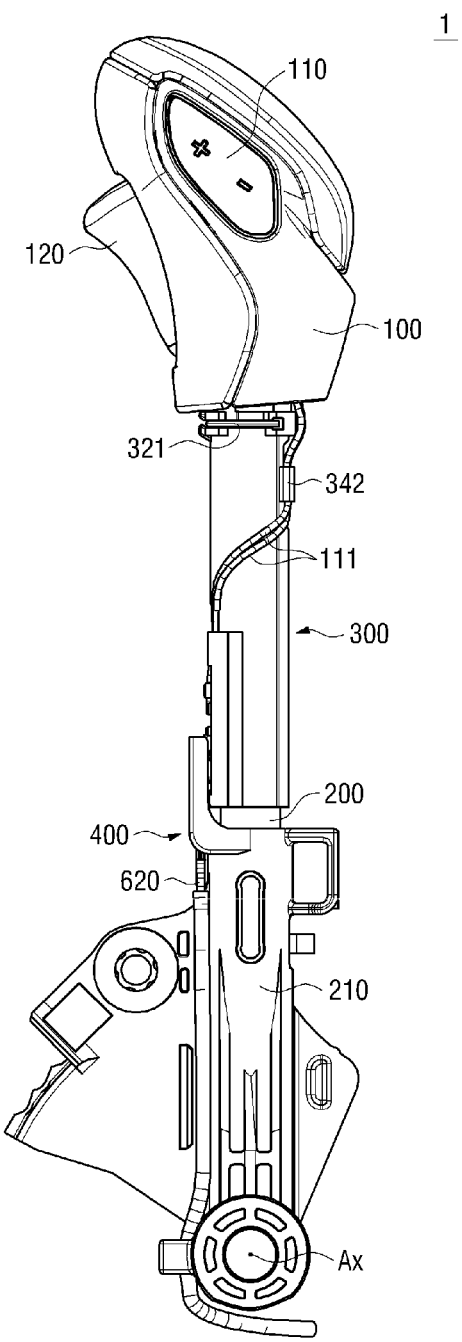
FIGS. 2 and 3 are side views illustrating the shift lever for the vehicle according to the exemplary embodiment of the present invention.
Figure 3:
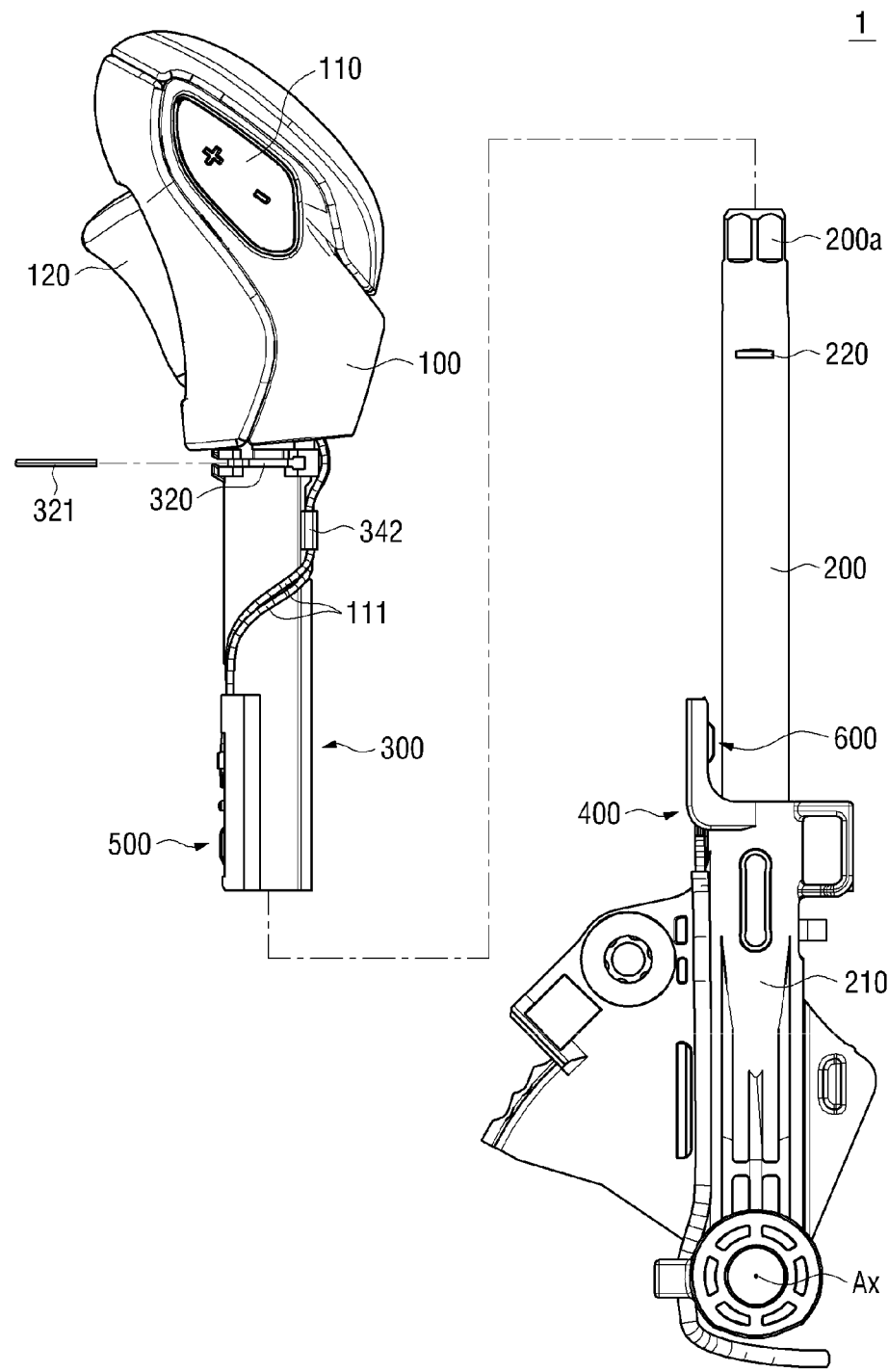
Figure 4:
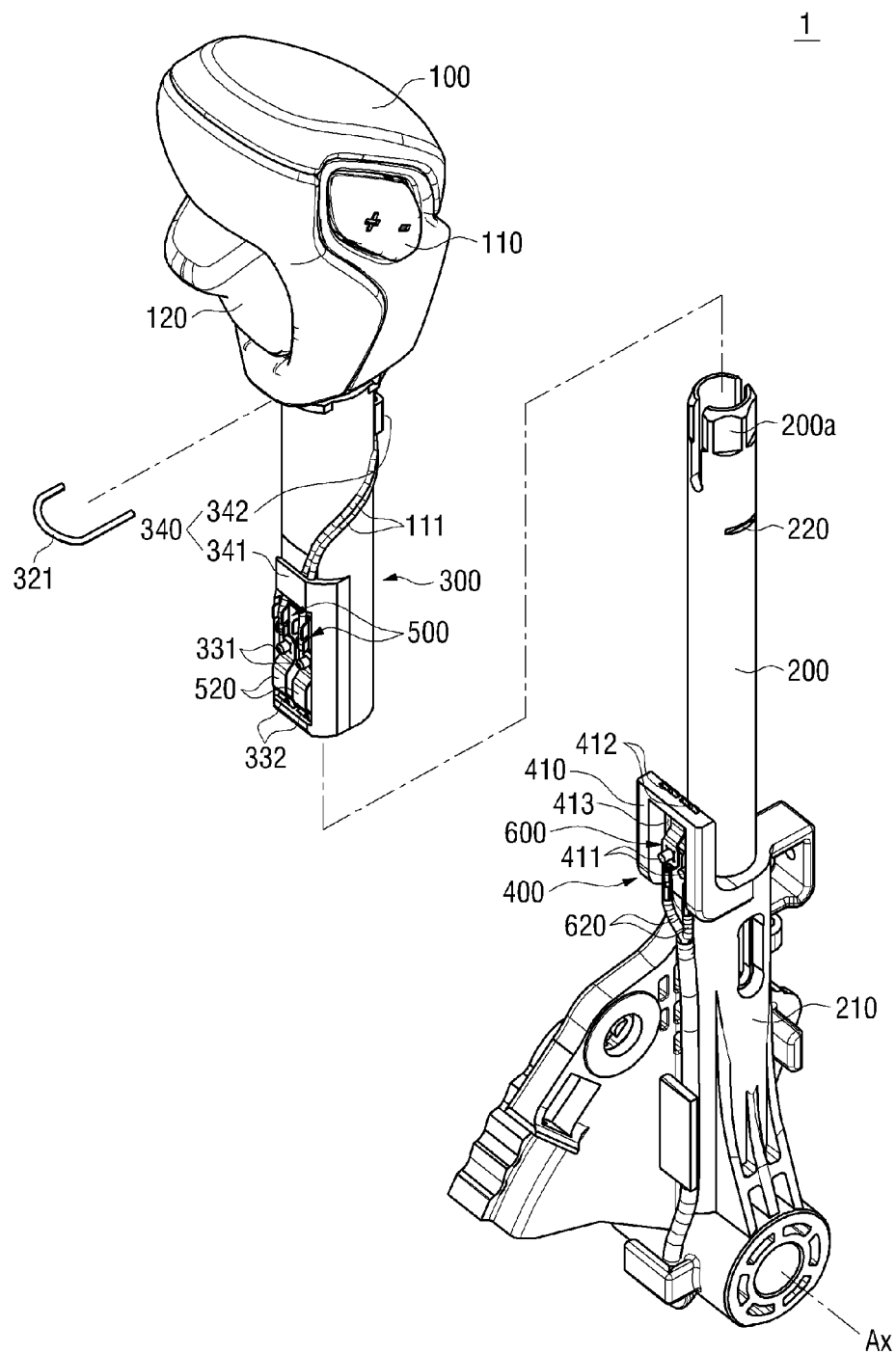
FIG. 4 is a detailed perspective view illustrating the shift lever for the vehicle according to the exemplary embodiment of the present invention.

FIG. 1 is a perspective view illustrating a shift lever for a vehicle according to an exemplary embodiment of the present invention, FIGS. 2 and 3 are side views illustrating the shift lever for the vehicle according to the exemplary embodiment of the present invention, and FIG. 4 is a detailed perspective view illustrating the shift lever for the vehicle according to the exemplary embodiment of the present invention. Referring to FIGS. 1 through 4, a shift lever 1 for a vehicle according to an exemplary embodiment of the present invention may include a knob 100, a rod 200, a first mounting member 300 and a second mounting member 400.

In the exemplary embodiment of the present invention, although the description will be given of the shift lever 1 for the vehicle installed between a center fascia and a console box of the vehicle to allow a driver to select the shift stage, the shift lever 1 for the vehicle may be installed at various locations within the vehicle accessible to the driver, without being limited thereto. Further, although the description will be given of the shift lever 1 for the vehicle moving in a predetermined range in a longitudinal direction or a lateral direction to select the gear stage and moves along a shift pattern having an "I" shape in the exemplary embodiment of the present invention, the movement direction may change based on various shift patterns such as a "H" shape and a "I+" shape.

Furthermore, although the description has been given of the shift lever 1 for the vehicle moving horizontally or vertically in the exemplary embodiment of the present invention, the shift lever 1 for the vehicle may also move diagonally based on the shift pattern, without being limited thereto. Further, in the exemplary embodiment of the present invention, the shift pattern may be understood as a moving path through which the shift lever 1 for the vehicle of the present invention moves to select the shift stage.

Moreover, the knob 100 may operate as a handle to allow the driver to perform the shift operation, and the driver may select a shift stage by applying a force (e.g., exerting pressure onto) while holding the knob 100. Meanwhile, the knob 100 may include constituent elements, such as a shift button 110 for the shift operation, and a release button 120 configured to release the shift lock function that allows the shift operation when the shift conditions are satisfied. However, these are merely an example to aid understanding of the present invention, and the knob 100 may include various constituent elements capable of performing the functions required for the shift operation, as well as the shift button 110 and the release button 120.

The knob 100 may be coupled with the rod 200 and when a force is applied to the knob 100, the rod 200 may be configured to move along the shift pattern and the shift stage may be selected. In an exemplary embodiment of the present invention, the expression "the knob 100 and the rod 200 are coupled to each other" may include that the knob 100 and the rod 200 are coupled to each other by various configurations that allow the force applied to the knob 100 to be transmitted to the rod 200 when the force is added to the knob 100, as well as that the knob 100 and the rod 200 are directly coupled to each other. The rod 200 may be coupled to the lever body 210 that allows the shift stage to be selected when the rod 200 moves, and when the rod 200 moves, the lever body 210 may be configured to rotate about a rotation axis Ax to allow the shift state to be selected.

In an exemplary embodiment of the present invention, the description will be given of the lever body 210 connected to the transmission via a shift cable (not illustrated), and when the lever body 210 rotates about the rotation axis Ax, the rotational force of the lever body 210 may be transmitted to the transmission and the shifting may be performed. However, the position of the lever body 210 may be detected via a contact or non-contact sensor in which various types such as mechanical, magnetic, electrical and optical types configured to detect the position of the lever body 210 are used, signals based on the detected positions may be transmitted to the transmission and the shifting may be performed, without being limited thereto. The first mounting member 300 may be disposed to surround the periphery of the rod 200, and at least one first connecting terminal 500 may be mounted thereon.

Figure 5:
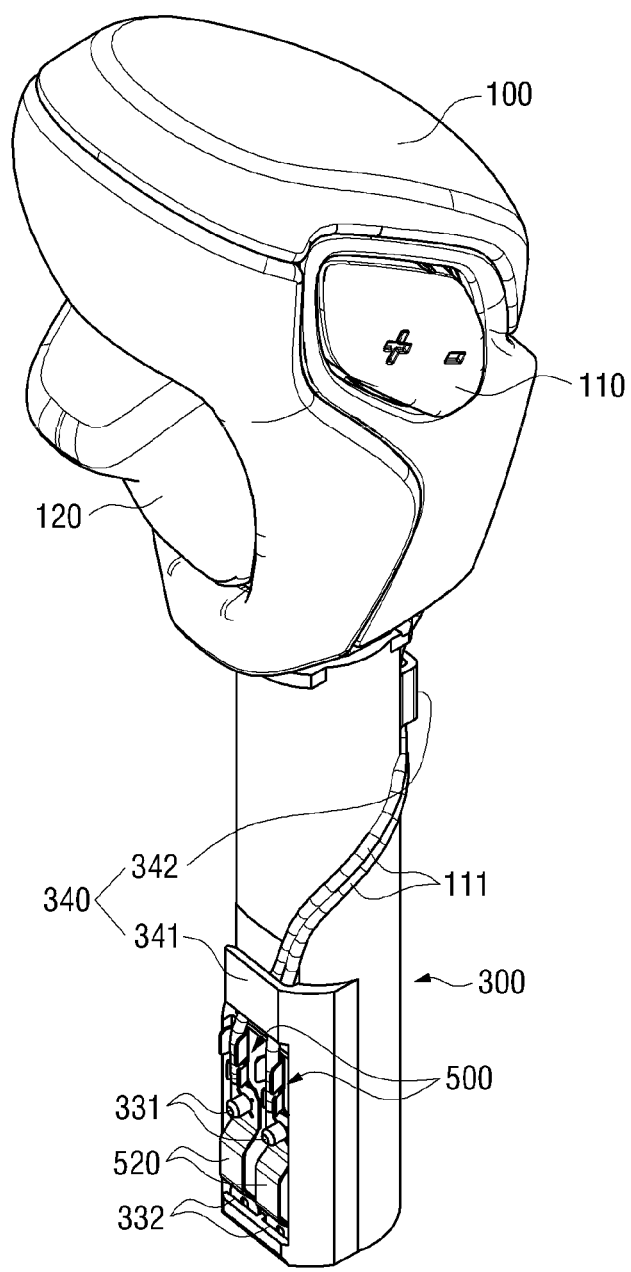
FIGS. 5 through 7 are perspective views illustrating a knob and a first mounting member according to the exemplary embodiment of the present invention.
Figure 6:
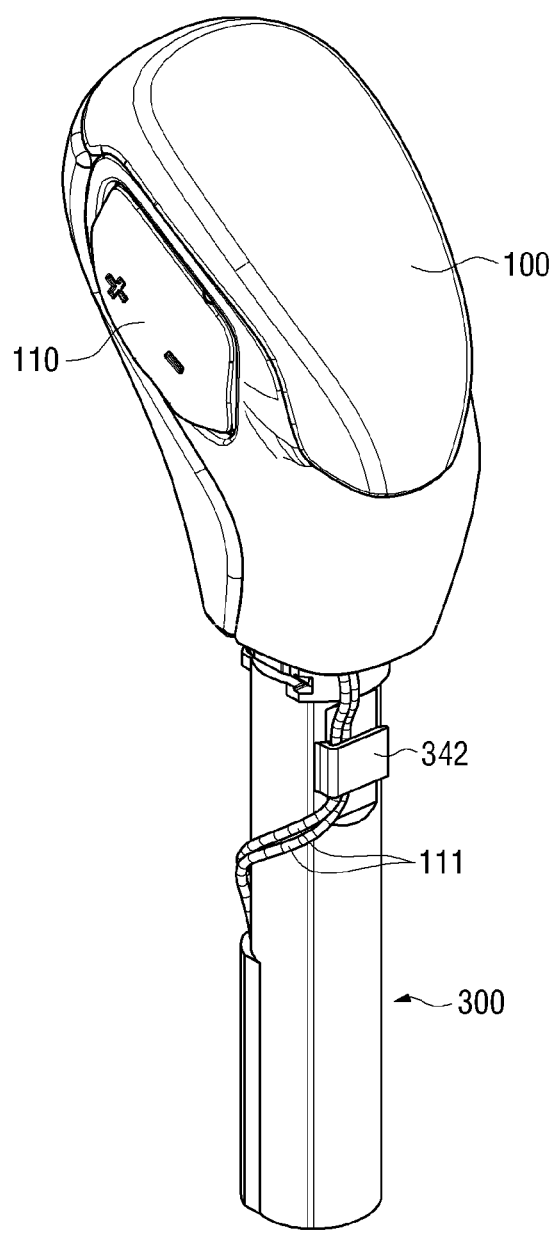
Figure 7:
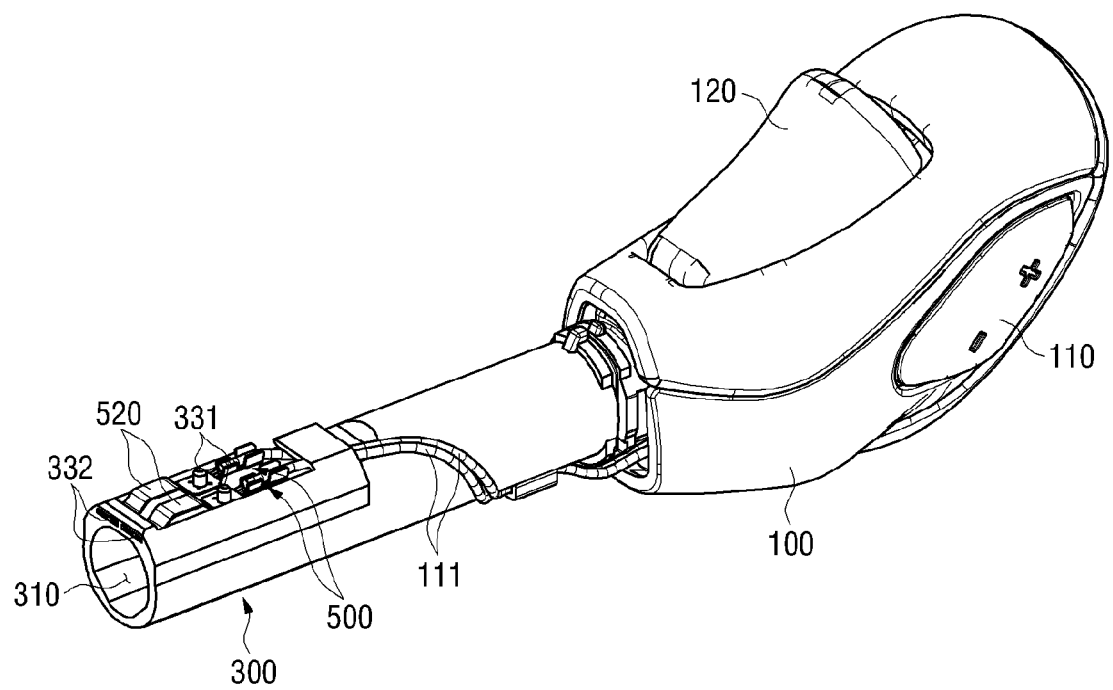
Figure 8:
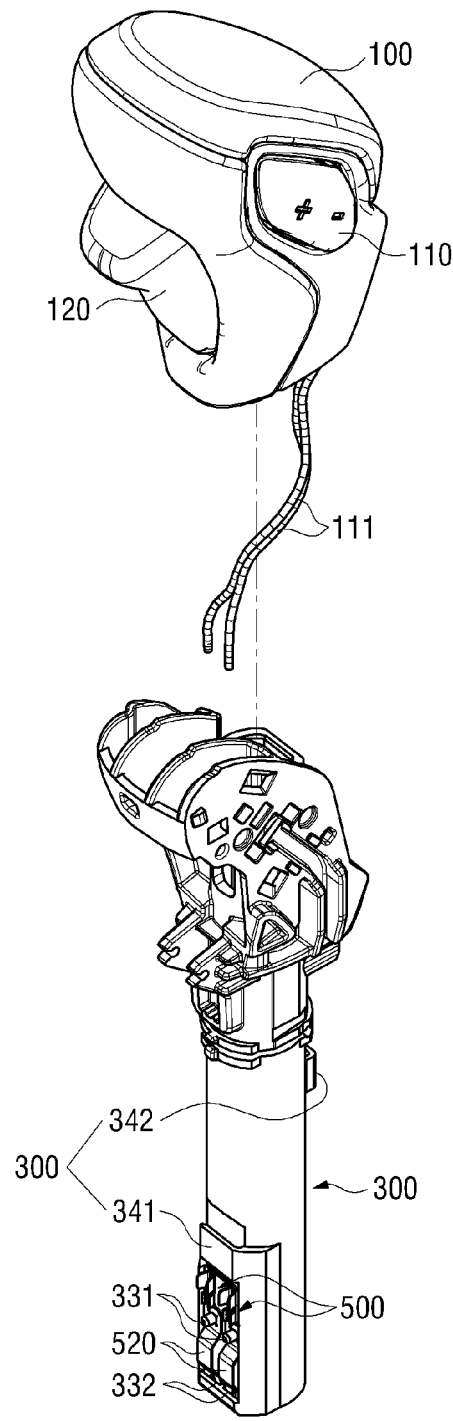
FIG. 8 is a detailed perspective view illustrating the knob and the first mounting member according to the exemplary embodiment of the present invention.

FIGS. 5 through 7 are perspective views illustrating the knob and the first mounting member according to the exemplary embodiment of the present invention, and FIG. 8 is a detailed perspective view illustrating the knob and the first mounting member according to the exemplary embodiment of the present invention. Referring to FIGS. 5 through 8, the first mounting member 300 according to the exemplary embodiment of the present invention may be formed with a cavity 310 having the shape of the rod 200, and since it may be formed to surround the periphery of the rod 200 inserted into the cavity 310, rigidity may be improved.

Additionally, a support 200a configured to support the first mounting member 300 may be formed at one end of the rod 200, and since such a support 200a may be formed with at least a part of the outer surface of the rod 200 is having a step (e.g., different height), the support 200a may be configured to limit the insertion length of the rod and to support the first mounting member 300. Further, since one end of the first mounting member 300 may be housed inside the knob 100, when a force is applied to the knob 100, the force applied to the knob 100 may be transmitted to the rod 200 disposed to be inserted into the cavity 310 of the first mounting member 300, and the rod 200 may move along the shift pattern.

In an exemplary embodiment of the present invention, although the description will be given of the knob 100 and the first mounting member 300 mutually separately formed and coupled to each other, the knob 100 and the first mounting member 300 may be formed integrally with each other, without being limited thereto. When the knob 100 and the first mounting member 300 are formed integrally with each other, the entire knob 100 may be formed integrally with the first mounting member 300, and a part of the knob 100 may be formed integrally with the first mounting member 300. For example, the knob 100 may include a cover 100a and a carrier 100b as illustrated in FIG. 9, the cover 100a may be formed integrally with the first mounting member 300 through the insert injection, and the carrier 100b, the shift button 110 and the release button 120 may also be separately coupled with one another.

Figure 9:
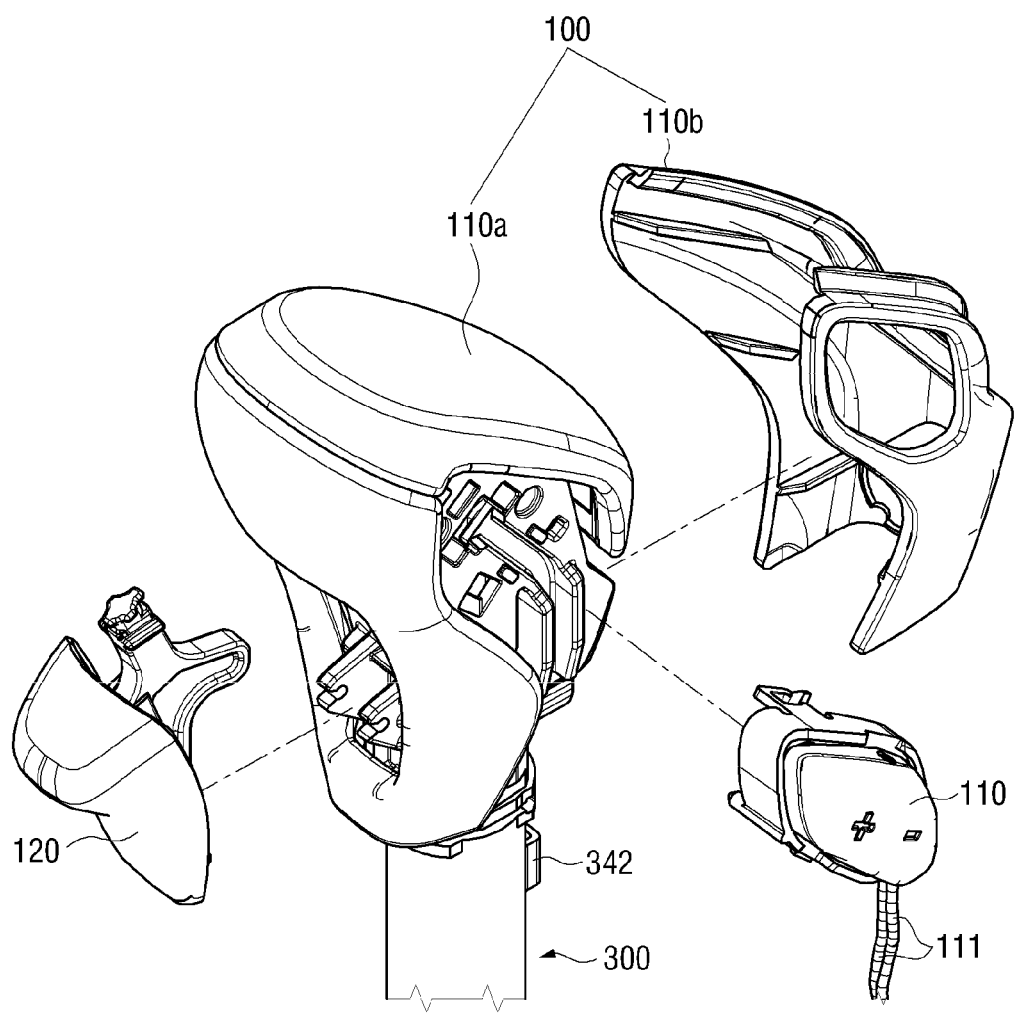
FIG. 9 is a detailed perspective view illustrating the knob according to the exemplary embodiment of the present invention.

Although FIG. 9 illustrates the cover 100a formed integrally with the first mounting member 300 as an example, this is merely an example to aid understanding of the present invention. Some of the various components of the knob 100 may be formed integrally with the first mounting member 300, and the remaining portions may be separately formed and coupled with the first mounting member 300a, without being limited thereto.

Figure 10:
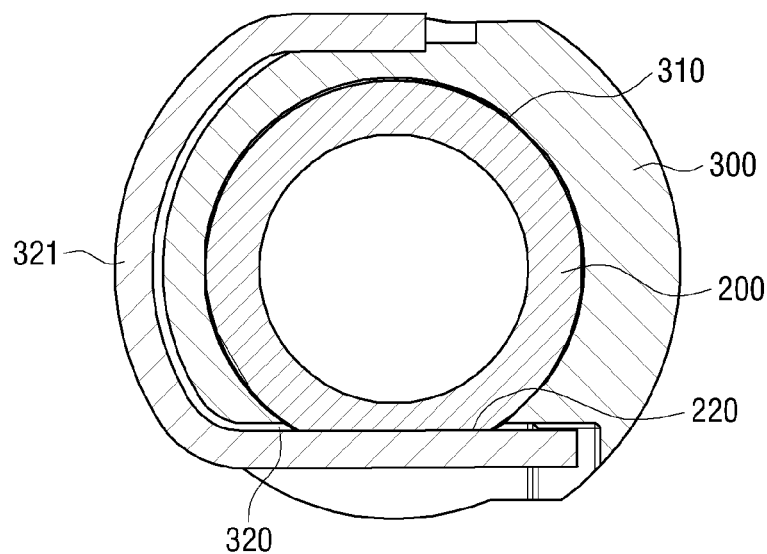
FIG. 10 is a cross-sectional view illustrating a rod that is fixed by a clip according to the exemplary embodiment of the present invention.

Referring back to FIGS. 1 through 4, a slot 320 may be formed on one side of the first mounting member 300, the rod 200 inserted into the cavity 310 may have a fixing groove 220 formed at a position that corresponds to the slot 320, and the fixing groove 220 formed in the rod 200 may be exposed through the slot 320, and the clip 321 may be inserted into the fixing groove 220 as illustrated in FIG. 10. Thus, the position of the rod 200 inserted into the cavity 310 of the first mounting member 300 may be fixed.

Although the description will be given of each of single slot 320 and single groove 220 formed in the exemplary embodiment of the present invention, the number and the formation position of the slot 320 and the groove 220 may be variously modified without being limited thereto. Additionally, at least one first connecting terminal 500 configured to transmit the electric signals generated from the knob 100 may be mounted on the first mounting member 300.

Figure 11:
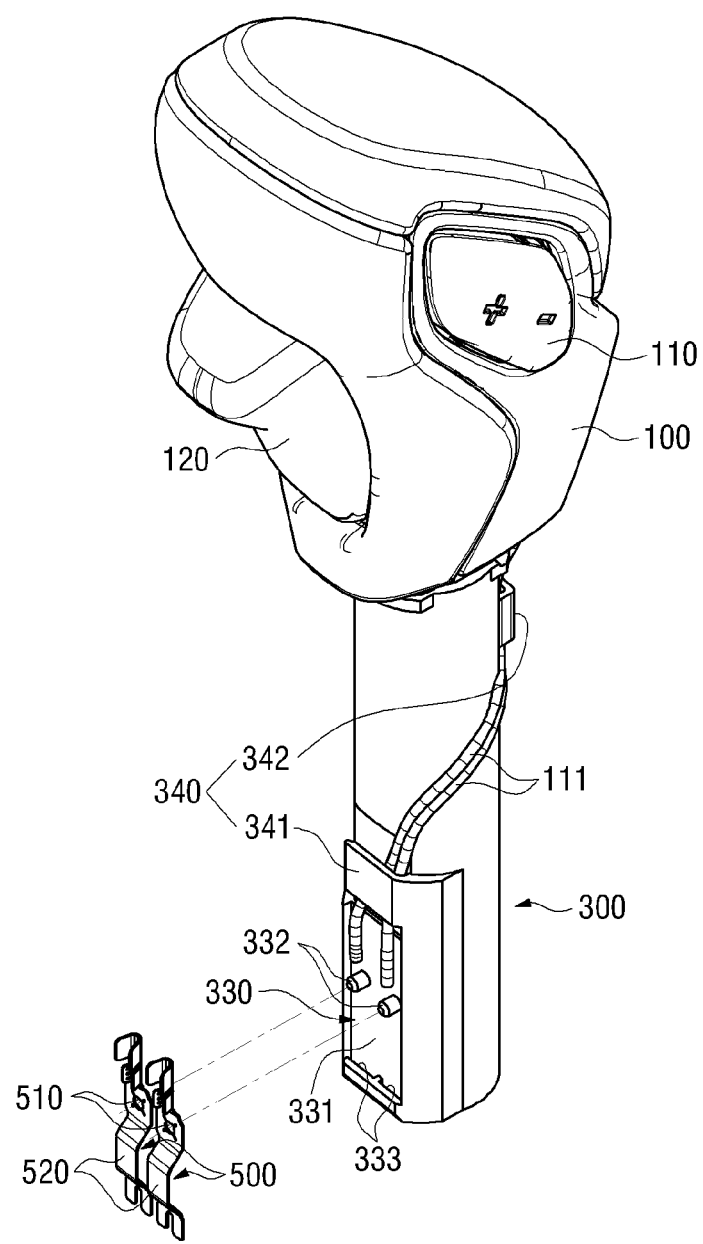
FIG. 11 is a detailed perspective view illustrating a first mounting member and a first connecting terminal according to the exemplary embodiment of the present invention.

FIG. 11 is a detailed perspective view illustrating the first mounting member and the first connecting terminal according to the exemplary embodiment of the present invention. Referring to FIG. 11, at least a part of the first mounting member 300 according to the exemplary embodiment of the present invention may include a seating portion 330 on which at least one first connecting terminal 500 may be seated.

In particular, the seating portion 330 may be formed by sinking of at least a part of the first mounting member 300, a surface 331 on which the at least one first connecting terminal 500 is seated may have a flat shape, and the surface 331 on which the at least one first connecting terminal 500 is seated may be formed to face a second mounting member 400 to be described later. In the exemplary embodiment of the present invention, at least one first connecting terminals 500 may be provided in a plural number, and when the at least one first connecting terminals 500 are provided in the plural number, the first connecting terminals 500 may be disposed parallel to each other.

Furthermore, although the description will be given of the two at least one first connecting terminals 500 provided in the exemplary embodiment of the present invention, this is merely an example to aid understanding of the present invention, and the number of first connecting terminals 500 may be variously modified based on the type and number of signals to be transmitted. Although the description will be given of when the least one first connecting terminals 500 are provided in the plural number, the terminals are disposed parallel to one another in the exemplary embodiment of the present invention, the terminals may also be disposed to face one another without being limited thereto.

The expression "when the least one first connecting terminals 500 are provided in the plural number and disposed parallel to one another" indicates that directions of coming into contact with at least one second connecting terminal 600 to be described later are the same. Further, the expression "when the least one first connecting terminals 500 are provided in the plural number and deposed to face one another" indicates that directions coming into contact with the at least one second connecting terminal 600 to be described later are opposite to each other.

The at least one first connecting terminals 500 may include a seating aperture 510 into which at least one seating protrusion 332 formed on the seating portion 330 may be inserted, and a first end of the at least one first connecting terminals 500 may be inserted into a seating groove 333 formed on a first side of the seating portion 330, and the position thereof may be fixed. The at least one first connecting terminals 500 may be connected to the shift button 110 disposed in the knob 100 via a cable 111, and may be configured to transmit the electric signals generated when operating the shift button 110 to the at least one second connecting terminal 600 to be described later.

The shift button 110 disposed in the knob 100 may be used to increase or decrease the number of stages of gears when the manual shift mode is selected as the shift mode. For example, in the shift pattern of the exemplary embodiment of the present invention, as illustrated in FIG. 12, the shift lever 1 for the vehicle of the present invention may be moved in one direction to select a parking stage (P), a reverse stage (R) a neutral stage (N), a driving stage (D) and a manual shift mode (M), and the stage M may be selected when attempting to switch from the automatic shift mode to the manual shift mode.

In other words, when selecting the stage M while the vehicle is being driven at the stage D as an automatic shift mode, the transmission may be shifted to the manual shift mode, and when selecting the stage D while the vehicle is being driven in the manual shift mode, the transmission may be shifted to the automatic shift mode. Therefore, when the stage M is selected, the transmission may be shifted to the manual shift mode, and it may be possible to increase or decrease the number of stages of gears by operating the shift button 110 in the manual shift mode.

Figure 13:
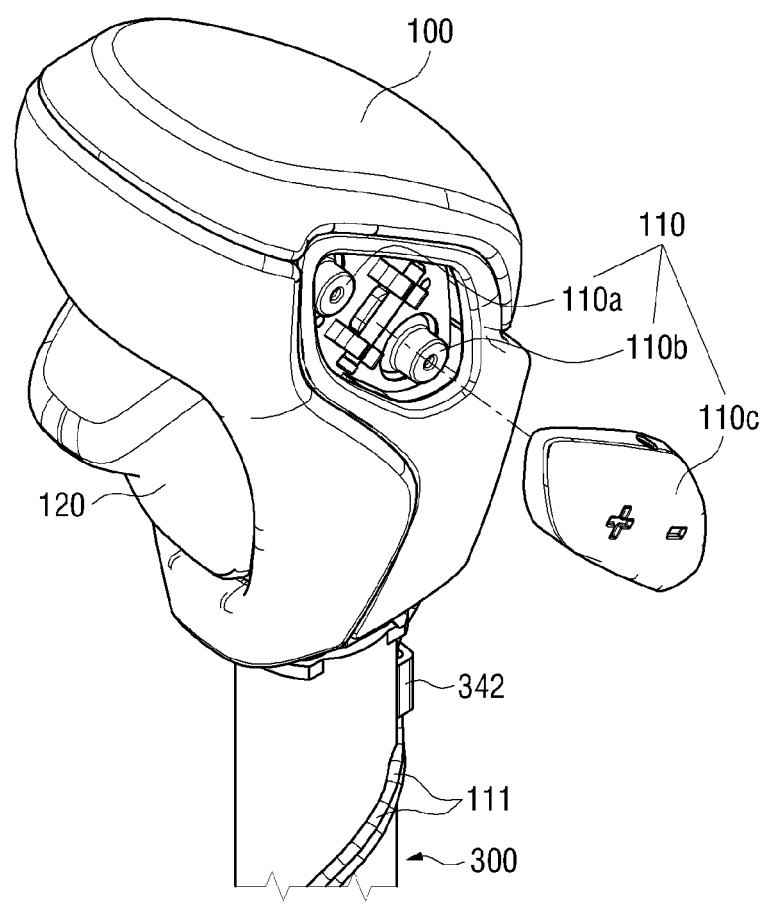
FIG. 13 is a detailed perspective view illustrating a shift button according to the exemplary embodiment of the present invention.

In addition, the shift button 110 may include a "+" button 110a and a "−" button 110b as illustrated in FIG. 13, and the "+" button 110a and the "−" button 110b may be disposed inside the button cover 110c. When one side (e.g., a first side) of the button cover 110c is pressed or engaged, the "+" button 110a may be pressed or engaged, and when the other side (e.g., a second side) of the button cover 110c is pressed or engaged the "−" button 110b may be pressed or engaged. Thus, a driver may increase or decrease the number of stages of gears, by operating the "+" button 110a or the "−" button 110b.

Further, in the exemplary embodiment of the present invention, since the "+" button 110a and the "−" button 110b may be formed of a material such as a rubber, when the shift button 110 is operated, an occurrence of noise or the like may decrease. In particular, when increasing or decreasing the number of stages of the gears using the shift button 110 in the manual shift mode, electric signals associated therewith may be transmitted to the transmission, and at least one first connecting terminal 500 may be configured to execute the transmission of electric signals generated from the shift button 110 through the cable 111.

In the exemplary embodiment of the present invention, although the description will be given the at least one first connecting terminal 500 transmitting electric signal generated from the shift button 110, at least one first connecting terminal 500 may transmit electric signals generated from the various components disposed in the knob 100, such as the aforementioned release button 120 as well as the shift button 110, without being limited thereto.

Moreover, as illustrated in FIGS. 5 to 8, the position of the cable 111 may be fixed by the fixing portion 340 formed on the first mounting member 300. In the exemplary embodiment of the present invention, although the description will be given of the fixing portion 340 spaced apart at regular intervals from the outer surface of the first mounting member 300 and fixing the cable 111 by allowing the cable 111 to be disposed in the spaced gap, various structures may be used in which a first side is fixed to the first mounting member 300 and a second side can fix the cable 111, without being limited thereto.

In the exemplary embodiments of the present invention, although the description will be given of when the fixing portion 340 may include a first fixing portion 341 formed in the vicinity of (e.g., proximate to) the mounting portion 330 and a second fixing portion 342 formed in the vicinity of (e.g., proximate to) the knob 100, this is merely an example to aid understanding of the present invention, and the number and formation position of the fixing portion 340 may be variously modified based on the position of the cable 111.

Meanwhile, in the exemplary embodiment of the present invention, although the description will be given of when at least one first connecting terminal 500 transmits the electric signal provided from the shift button 110, the present invention is not limited thereto, and it may also be possible to transmit electric signals in both directions such as transmission of the electric signals to a display device, when a display device (not illustrated) configured to display selectable gear stages or a currently selected gear stage is disposed on the knob 100. At least one second connecting terminal 600 which comes into contact with at least one first connecting terminal 500 for the transmission of electric signals may be mounted on the second mounting member 400.

Figure 14:
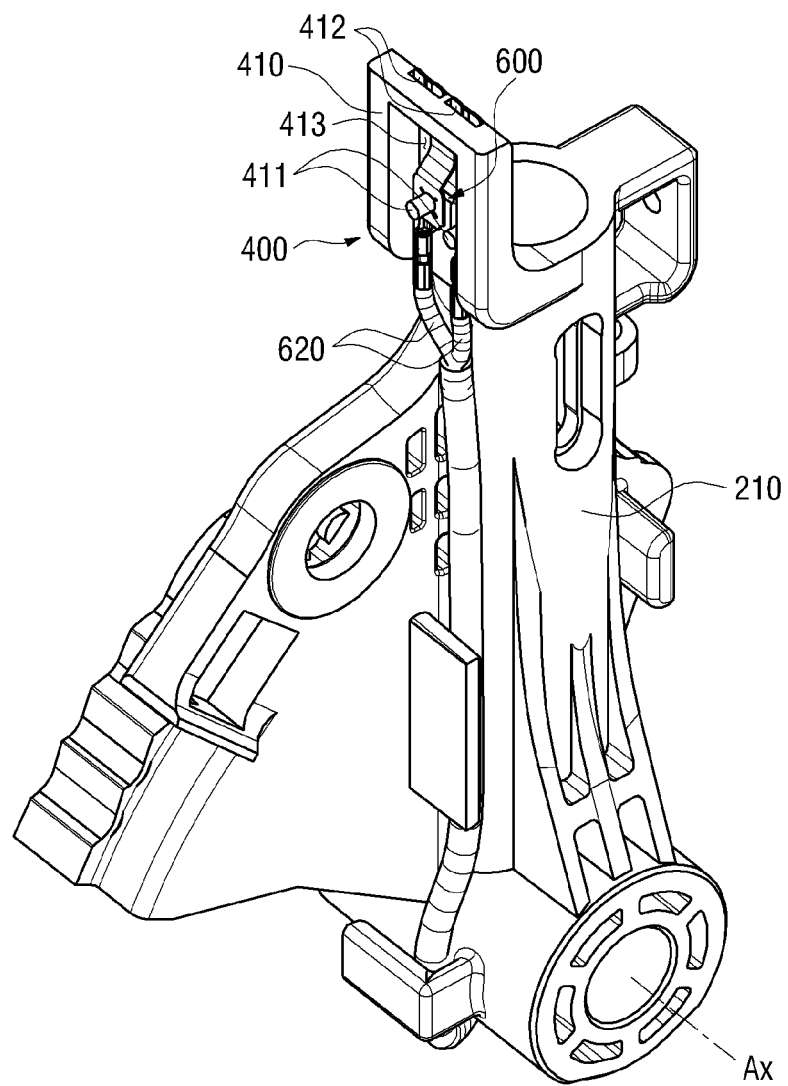
FIGS. 14 and 15 are perspective views illustrating a second mounting member and a second connecting terminal according to the exemplary embodiment of the present invention.
Figure 15:
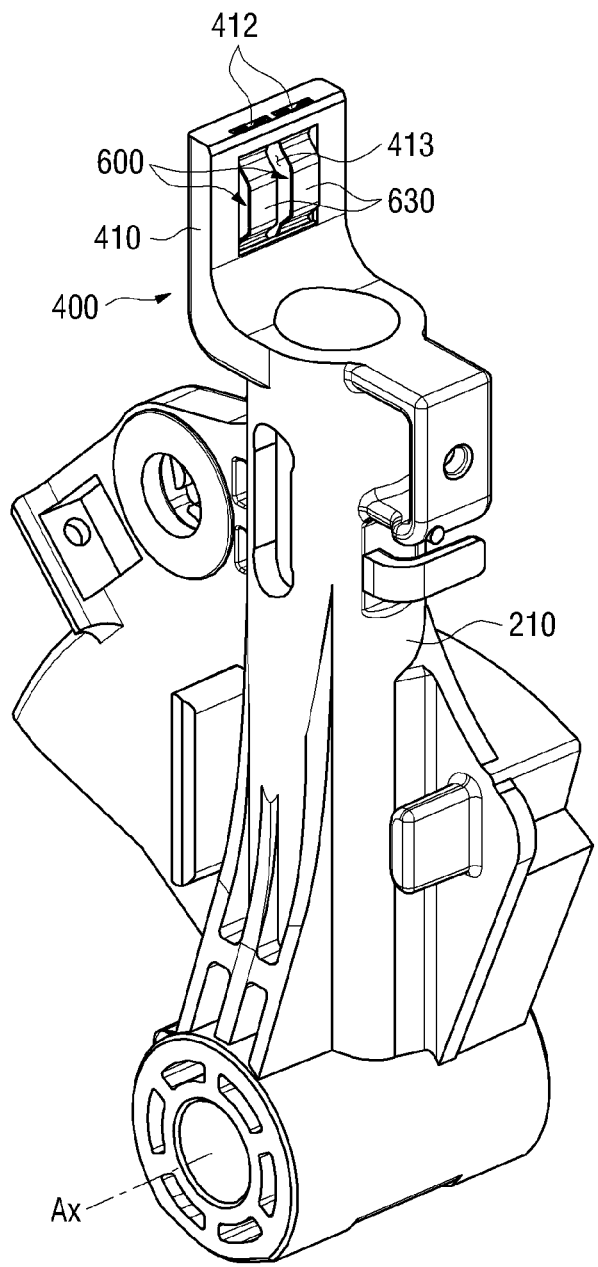
Figure 16:
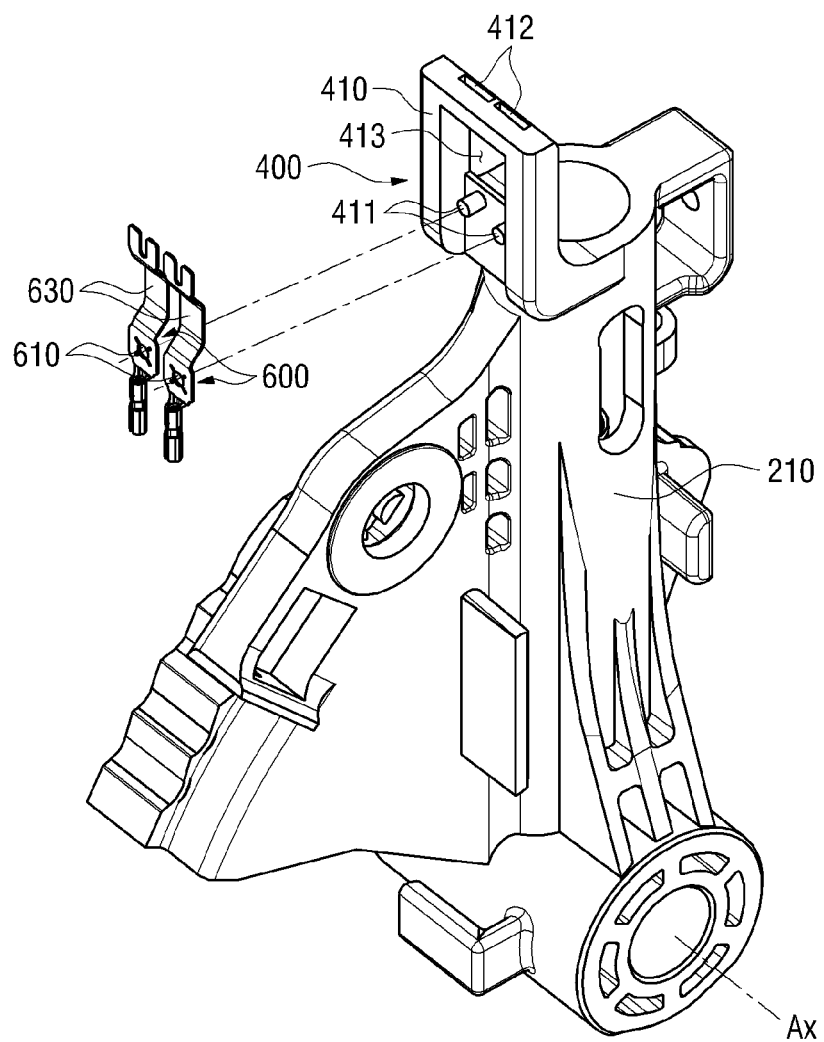
FIGS. 16 and 17 are detailed perspective views illustrating the second mounting member and the second connecting terminal according to the exemplary embodiment of the present invention.
Figure 17:
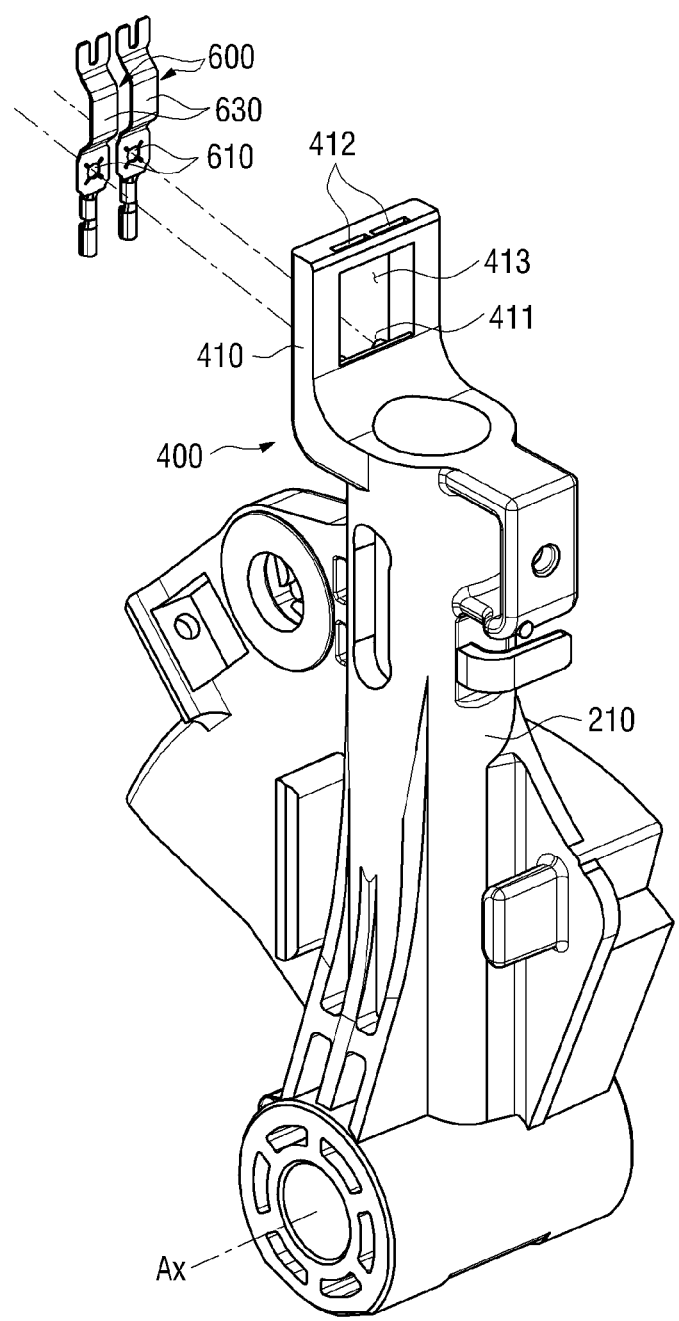

FIGS. 14 and 15 are perspective views illustrating the second mounting member and the second connecting terminal according to the exemplary embodiment of the present invention, and FIGS. 16 and 17 are detailed perspective views illustrating the second mounting member and the second connecting terminal according to the exemplary embodiment of the present invention. Referring to FIGS. 14 through 17, in the exemplary embodiment of the present invention, the second mounting member 400 may be formed on a first side of the lever body 210 coupled with the rod 200, and the second mounting member 400 may include a flange portion 410 that protrudes toward the first mounting member 300.

Although the description will be given of when the flange portion 410 is formed integrally with the lever body 210 and is formed to extend from one side of the lever body 210 in the exemplary embodiment of the present invention, the flange portion 410 may also be formed separately and coupled with the lever body 210, without being limited thereto.

A first surface of the flange portion 410 may be disposed to face the seating portion 330 formed in the first mounting member 300. Additionally, the flange portion 410 may be formed with at least one mounting protrusion 411 inserted into a mounting aperture 610 formed on at least one second connecting terminal 600, and an insertion aperture 412 into which one end of at least one second connecting terminal 600 is inserted may be formed on one side of the flange portion 410.

In the exemplary embodiment, although the description will be given of when the at least one second connecting terminals 600 are provided in a plural number and come into contact with each other in the same manner as the at least one first connecting terminals 500, and the number of at least one second connecting terminals 600 may vary based on the number of at least one first connecting terminals 500. Further, the description will be given of when the at least one second connecting terminals 600 are provided in the plural number, the terminals may be disposed parallel to one another in the same manner as the at least one first connecting terminals 500.

Furthermore, the at least one first connecting terminals 500 may be provided in the plural number and may be disposed to face each other, when the at least one second connecting terminals 500 are provided in the plural number, the plurality of first second connecting terminals 600 may also be disposed to face each other, and in this case, the shape and structure of the flange portion 410 may also be varied together. At least one second connecting terminals 600 may be connected to the cable 620 to transmit the electric signals transmitted from at least one first connecting terminal 500 via the cable 620, or may be configured to transmit the electric signals transmitted via the cable 620 to the at least one first connecting terminal 500.

Meanwhile, the flange portion 410 may include an opening 413 in which the interior penetrates and thus, at least one first connecting terminal 500 and at least one second connecting terminal 600 may be visible from the exterior. Particularly, the opening 413 may be configured to allow assembling and disassembling of at least one second connecting terminal 600 through the opening 413, thereby improving the workability. When the opening 413 is formed in the flange portion 410, the mounting protrusion 411 may be formed in the vicinity of (e.g., proximate to) the first side of the opening 413, and the insertion aperture 412 may be formed in the vicinity of (e.g., proximate to) the second side of the opening 413. However, the formation positions of the mounting protrusion 411 and the insertion aperture 412 may vary, without being limited thereto.

In the exemplary embodiment of the present invention, although the description has been given of when the opening 413 is formed in the flange portion 410, this is merely an example to aid understanding of the present invention. The flange portion 410 may be shielded by omitting the opening 413, and when the opening 413 is omitted, the positions of the mounting protrusion 411 and the insertion aperture 412 may vary.

Figure 18:
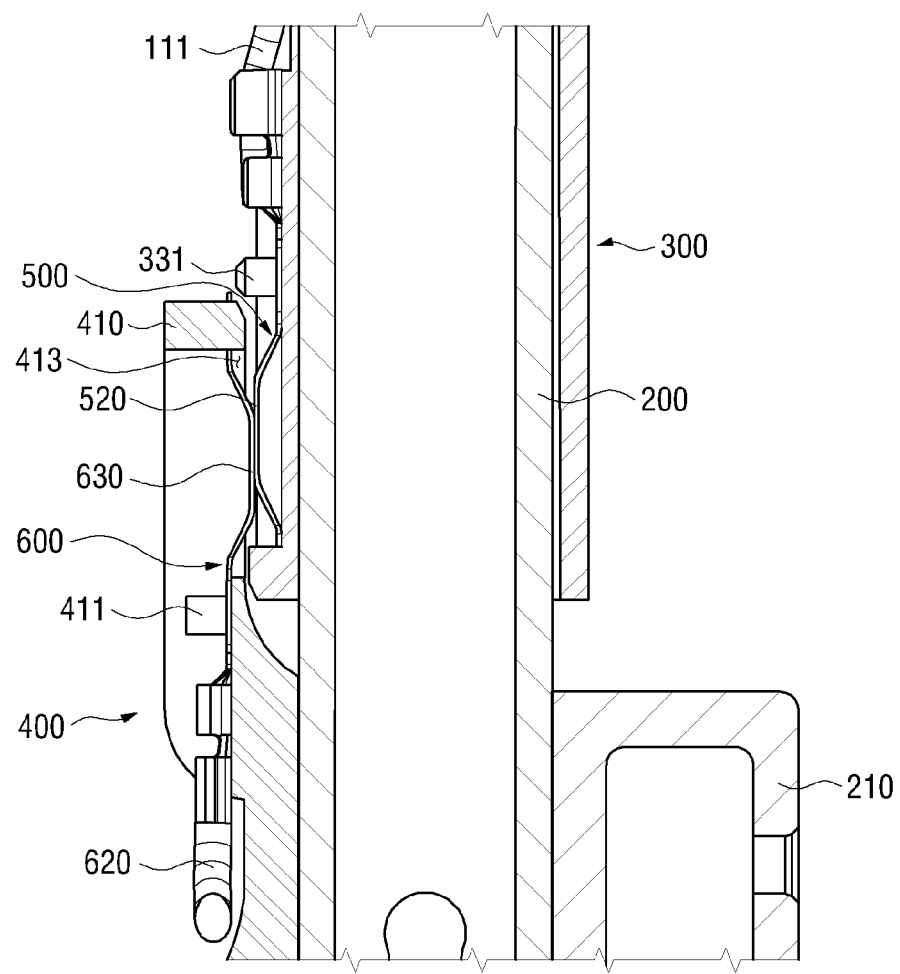
FIG. 18 is a cross-sectional view illustrating a shift lever for a vehicle according to an exemplary embodiment of the present invention.

Additionally, a central portion 520 of at least one first connecting terminal 500 may have a convex shape toward the second mounting member 400, and a central portion 600 of at least one second connecting terminal 630 may have a convex shape toward the seating portion 330. Thus, when the rod 200 is inserted into the cavity 310 of the first mounting member 300, as illustrated in FIG. 18, the central portion 520 of the at least one first connecting terminal 500 and the central portion 630 of the at least one second connecting terminal 600 may come into contact with each other to face and may be electrically connected to each other.

In particular, in the shift lever 1 for the vehicle according to the exemplary embodiment of the present invention, when the knob 100 and the rod 200 are assembled, i.e., when the rod 200 is inserted into the cavity 310 of the first mounting member 300, the at least one first connecting terminal 500 and the at least one second connecting terminal 600 may be electrically connected to each other to allow the transmission of the electric signals. Thus, the assembly process of the knob 100 and the rod 200 and the process for electrically connecting between the knob 100 and the rod 200 may be performed together, the overall assembly process may be simplified, and the working time may be reduced.

Similarly, even when separating the knob 100 and the rod 200, since the components may be easily separated without excessive force, they may be more easily separated even during maintenance. Further, in the shift lever 1 of the vehicle according to the exemplary embodiment of the present invention, the rod 200 may be inserted into the first mounting member 300, and the at least one first connecting terminal 500 may be disposed in the seating portion 300 formed by sinking of at least a part of the first mounting member 300. Accordingly, since the space required for the electrical connection between the knob 100 and the load 200 may be reduced, the overall size may be reduced.

Those skilled in the art to which this invention pertains will understand that the present invention may be embodied in other specific forms without changing the technical spirit or essential features. Accordingly, the exemplary embodiments described above should be understood as being illustrative rather than being restrictive in all aspects. The scope of the present invention is illustrated by the appended claims to be described later rather than by the foregoing detailed description, and all changes or modified forms derived from the meaning and the scope of the claims and the equivalent concepts thereof should be interpreted as being included within the scope of the present invention.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A shift lever for a vehicle, comprising:
   a knob mounted to the shift lever;
   a rod coupled to the knob;
   a first mounting member disposed to surround the rod in a hollow shape;
   at least one first connecting terminal fixed to the first mounting member;
   a second mounting member; and
   at least one second connecting terminal fixed to the second mounting member, wherein the at least one second connecting terminal comes into contact with the at least one first connecting terminal for transmission of electric signals,
   wherein the first mounting member includes a seating portion on which the at least one first connecting terminal is seated in at least a portion,
   wherein the seating portion is formed in a recess along an outer surface of the first mounting member, and
   wherein the seating portion is located on a portion where the first mounting member surrounds the rod.

2. The shift lever for the vehicle of claim 1, wherein a surface of the seating portion on which the at least one first connecting terminal is seated has a flat shape, and the surface on which the at least one first connecting terminal is seated is formed to face the second mounting member.

3. The shift lever for the vehicle of claim 1, wherein the seating portion is formed by sinking at least a part of the first mounting member.

4. The shift lever for the vehicle of claim 1, wherein the at least one first connecting terminal includes a seating aperture into which a seating protrusion formed on the seating portion is inserted.

5. The shift lever for the vehicle of claim 1, wherein a first end of the at least one first connecting terminal is inserted into a seating groove formed on a first side of the fixing portion.

6. The shift lever for the vehicle of claim 1, wherein the at least one first connecting terminal includes a plurality of first connecting terminals, the plurality of first connecting terminals being disposed parallel to each other.

7. The shift lever for the vehicle of claim 1, wherein the at least one first connecting terminal is connected to a cable configured to transmit electric signals provided from the knob.

8. The shift lever for the vehicle of claim 7, wherein the knob includes a shift button for selecting a shift stage in a manual shift mode, and the cable is configured to transmit the electric signals provided from the shift button to the at least one first connecting terminal.

9. The shift lever for the vehicle of claim 7, wherein the first mounting member includes a fixing portion formed integrally with the first mounting member to fix the cable.

10. The shift lever for the vehicle of claim 9, wherein the fixing portion includes a first fixing portion configured to fix the cable proximate to the at least one first connecting terminal; and a second fixing portion configured to fix the cable proximate to the knob.

11. The shift lever for the vehicle of claim 1, wherein a central portion of the at least one first connecting terminal is formed in a convex shape.

12. The shift lever for the vehicle of claim 11, wherein the central portion of the at least one second connecting terminal is formed in the convex shape to face and come into contact with the central portion of the at least one first connecting terminal.

13. The shift lever for the vehicle of claim 1, wherein the first mounting member is at least partially housed inside the knob.

14. The shift lever for the vehicle of claim 1, wherein a slot is formed on a first side of the first mounting member, and the shift lever include a clip coupled to a fixing groove formed on the rod through the slot.

15. The shift lever for the vehicle of claim 1, further comprising:
a lever body coupled with the rod to switch the gear stage, wherein the second mounting member is formed on the lever body.

16. The shift lever for the vehicle of claim 15, wherein the second mounting member includes a flange portion that protrudes toward the first mounting member from the lever body.

17. The shift lever for the vehicle of claim 16, wherein the at least one second connecting terminal includes a mounting aperture into which a mounting protrusion formed on the flange is inserted.

18. The shift lever for the vehicle of claim 16, wherein a first end of the at least one second connecting terminal is inserted into the insertion aperture formed on a first side of the flange portion.

19. The shift lever for the vehicle of claim 16, wherein the flange portion includes an opening in which the interior penetrates and the at least one first connecting terminal and the at least one second connecting terminal are visible from the outside.

* * * * *